July 22, 1969 P. DEMAN 3,457,512

ANGLE-MODULATED SIGNAL RECEIVING SYSTEM WITH IMPROVED NOISE IMMUNITY

Filed Oct. 7, 1965 3 Sheets-Sheet 1

Inventor
Pierre Deman
by Michael S. Striker
Attorney

Inventor
Pierre Deman
by Michael J. Striker
Atty.

July 22, 1969 P. DEMAN 3,457,512

ANGLE-MODULATED SIGNAL RECEIVING SYSTEM WITH IMPROVED NOISE IMMUNITY

Filed Oct. 7, 1965 3 Sheets-Sheet 3

Inventor
Pierre Deman
by Michael J. Striker
Attorney

United States Patent Office 3,457,512

Patented July 22, 1969

3,457,512

ANGLE-MODULATED SIGNAL RECEIVING SYSTEM WITH IMPROVED NOISE IMMUNITY

Pierre Deman, Paris, France, assignor to Compagnie Francaise Thomson-Houston, Paris, France, a corporation of France Filed Oct. 7, 1965, Ser. No. 493,746

Claims priority, application France, Oct. 16, 1964, 991,697; June 9, 1965, 19,987

Int. Cl. H04b 1/06

U.S. Cl. 325—307 17 Claims

ABSTRACT OF THE DISCLOSURE

Angle-modulated intelligence signals are received in an angle discriminator utilizing a phase-lock loop comprising a variable oscillator controlled by the output signal of the angle-discriminator. The output signal of the oscillator is applied to the angle-discriminator and, with 90° phase shift, to an angle-responsive demodulator, the output signal of which corresponds to the received signal amplitude and controls a gate connected between the angle-discriminator and the variable oscillator, said gate being closed when said amplitude is lower than a threshold value. The term angle modulation here is used to denote either phase or frequency modulation.

This invention relates to communication systems of the type using angle-modulated signals, that is, frequency- or phase-modulated signals, and is more particularly concerned with the receiver apparatus in such systems.

Still more particularly the invention relates to angle-modulated signal receivers of the so-called phase-lock or frequency-lock type. In such a receiver, the received signal is applied to a phase-demodulator (or phase-discriminator) and the demodulated signal is applied to the frequency-controlling input of a variable-frequency local oscillator. The oscillator output is fed back to the demodulating or phase-controlling input of the phase-discriminator. Due to the phase feedback loop thus provided, the frequency and phase of the output signal from the oscillator is at all times locked, i.e. synchronized, with that of the incident signal, so that the oscillator output signal provides an improved replica of the incident signal. A major advantage of this type of receiver is that the reception threshold thereof is substantially lower than in more conventional types of angle-modulated signal receivers.

However, conventional angle-lock receivers of this kind have suffered from a serious defect, especially in long-distance communication systems, in that they have been prone to so-called signal loss. This objectionable condition is connected with the well-known 360 degree angular uncertainty that besets any phase determination. Because of this angular indeterminacy, it is essential in a receiver of angle-modulated signals, that the receiver should continuously keep track of the current modulation angle value. The occurrence of noise in the received signal is liable, in certain circumstances to be specified presently, to cause the system to lose track of the true modulation angle, and cause the receiver, due to the above-mentioned phase-lock feedback loop, to lock in or become synchronized with a spurious modulation angle differing by 360° or a multiple thereof from the true modulation angle relating to the intelligence being transmitted. The system then receives noise instead of intelligence, and this situation is liable to persist over relatively long periods of time. The comparatively long duration of such a signal-loss condition is due to the fact that after the noise disturbance that has caused the original loss of intelligence signal has subsided, the system must "search" or hunt for the lost intelligence modulation angle. This search or hunt period is the longer as the feedback rate used in the phase feedback is higher, that is, as the phase-lock system is more efficient under normal circumstances. In this way considerable amounts of transmitted information are liable to be lost.

It is an object of this invention to provide angle-lock receivers in which the above and related defects are very greatly reduced, through a reduction both of the likelihood that the receiver will erroneously lock in with noise rather than the intelligence signal, and a reduction of the time duration of such a signal loss situation when it does occur.

Another object is to provide a novel combination of angle-lock receivers with diversity reception techniques, whereby to achieve the benefits of angle-lock reception including especially low reception threshold not normally present in conventional diversity receivers, without the above-mentioned disadvantages thereof.

While diversity reception is well-known per se in connection with angle-modulation systems, to the best of applicant's knowledge it has not heretofore been successfully applied to angle-lock receivers, and it is among the objects of this invention to accomplish such a combination in a successful manner. A further object is to provide frequency- and phase-lock receivers adapted for use both with positional diversity, and frequency (and/or phase) diversity reception. Other objects will appear.

Exemplary embodiments of the invention will now be described for purposes of illustration but not of limitation with reference to the accompanying drawings wherein.

Broadly speaking, the invention comprises a generally conventional angle-lock reception channel for angle-modulated signals, and preferably two or more such channels arranged in diversity relationship. Each channel, in addition to the conventional phase-lock circuitry, includes a gate interposed in the channel which gate is normally open but can be closed to disable the channel. Means are provided for closing the gate in response to excessive noise content in the received signal. When a gate is closed and the related channel thus disabled, reception preferably continues through the alternative channel or channels of the diversity system.

Figure 1:
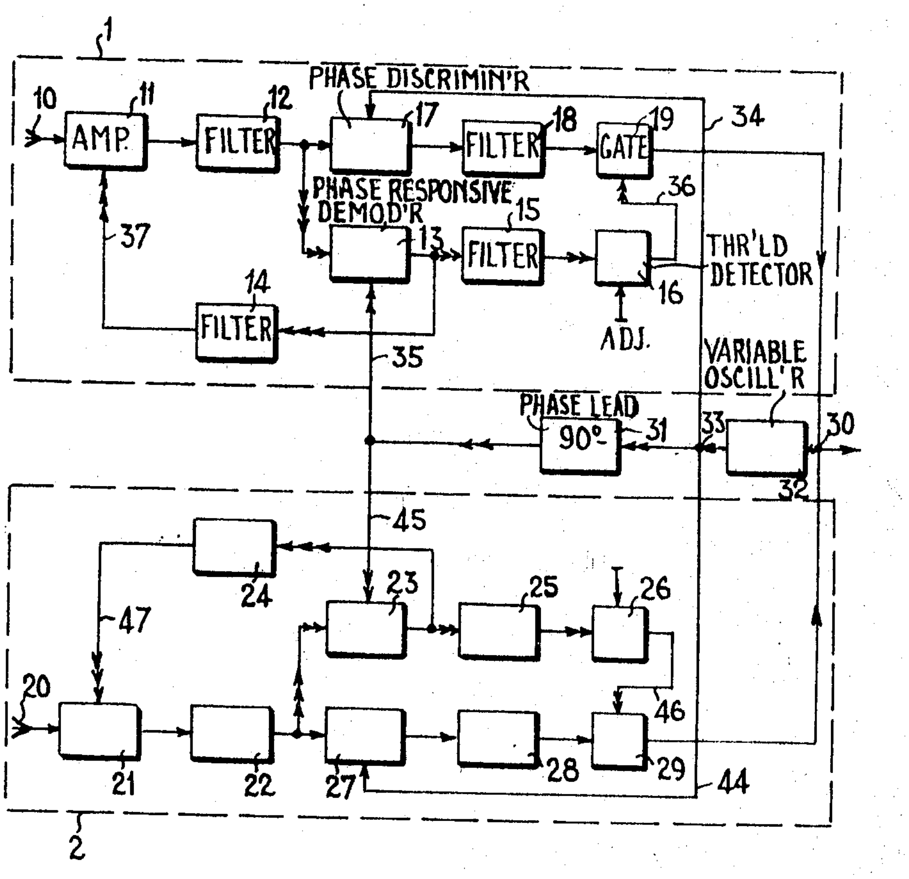
FIG. 1 is a functional diagram of a first embodiment.

Furthermore, an important feature of the invention is based on the recognition that the objectionable condition of signal loss referred to above is liable to occur whenever a noise component present in the received signal cancels the intelligence signal being transmitted, that is, goes through a condition in which it momentarily is opposite in phase to, and at least as large in amplitude as, the intelligence signal being received. When such a condition arises, the noise is liable to cause a 360° rotation of the phase angle with which the phase-lock system is synchronized, and the system thereupon persistently receives noise rather than intelligence. The invention, accordingly, includes means for sensing those periods during signal reception, when the total signal undergoes a substantial decrease in amplitude, indicating that the noise content in the received signal is approaching a condition in which it would directly cancel the intelligence component of the signal and there consequently exists a high probability of signal loss. When such a condition is sensed, the aforementioned gate is closed and the channel is disabled, preventing the signal loss situation from arising. Reference is now made to FIG. 1 of the drawings.

The phase-lock, frequency-modulation receiver shown in FIG. 1 includes two generally identical channels 1 and 2. Corresponding components in the two channels are designated with reference numbers having the same unit digits. The two channels 1 and 2 are arranged in diversity relationship, and in this embodiment the desired diversification between the signals in the respective channels is obtained through the use of two separate antennas 10, 20 spaced apart a suitable distance as is well-known in this technique (position-diversity reception).

The outputs of both channels 1 and 2 are connected in common to the frequency-control input 30 of a variable-frequency oscillator 32. The terminal 30 may constitute the output of the receiver of the invention. It will be understood that the output signal at terminal 30 can then be processed in a convenional manner in the usual audio-frequency amplification stages, not shown.

For greater clarity in the description the circuitry of each signal reception channel 1 and 2 may be broken down into three paths or circuits, viz.: a signal circuit proper, marked out in the diagram with single-headed arrows; a noise-responsive gate control circuit, indicated by double-headed arrows; and an automatic gain control feedback circuit, indicated by triple-headed arrows.

Considering first the main or proper signal path (single arrows), this leads from antenna 10 (or 20) through a conventional variable-gain R-F amplifier 11 (21) to a bandpass filter 12 having a bandwidth corresponding to that of the received frequency-modulation signals. The filtered, amplified signals are then applied to the input of a conventional phase demodulator or discriminator 17, which has a phase control input fed by way of a phase feedback connection 34 (44) from the oscillator output 33. The demodulated component of the incident signal, delivered by phase discriminator 17 (27) is passed through a low-pass filter network to the input of an electronic switch or gate circuit 19 (29) which is normally in a signal-passing or open condition. The signal passed by the gate is applied to the frequency-controlling input 30 of oscillator 32.

It will be realized that except for gate 19 (29) the signal circuit just described constitutes a generally conventional phase lock receiver circuit wherein any variation in the phase or frequency of the incident signal produces a corresponding error voltage at the output of phase discriminator 17 (27), which error voltage is applied to oscillator control input 30 to modify the output frequency or phase thereof in a sense to reduce said error voltage. The oscillator output signal appearing at 33 is thus accurately synchronized in frequency and phase with the incident frequency-modulated signal from antenna 10 (20), while the oscillator input signal present at terminal 30 constitutes the desired demodulated signal.

It will also be apparent that with both gates 19 and 29 normally open, i.e. in the absence of appreciable noise in either channel of the diversity system, the useful signals from both channels are combined at the input of the common oscillator 32.

Means are provided according to the invention for closing gate 19 or gate 29 in case the noise content in the signal passed through the related channel 1 or 2 momentarily exceeds a prescribed value. More precisely, in this embodiment the gate is closed in case the total signal amplitude sustains a sharp decrease, indicating that the noise content in the received signal tends to approach a condition in which it would cancel the intelligence content of the signal, and thus becomes liable to cause the phase-lock receiver to lose track of the true intelligence modulation angle and become synchronized with a spurious "noise-modulation" angle as earlier outlined herein and as will be more fully explained later.

The said noise-sensing and gate-closing means in each channel comprises the afore-mentioned gate-control circuit marked out by double arrowheads, and includes a unti 13 (23) which may be similar in construction with the conventional phase-demodulator or discriminator 17 (27) but which unit is herein referred to as a phase-responsive amplitude demodulator for reasons that will presently appear. The demodulator unit 13 (23) has its signal input connected to the output of input filter 12 (22) in parallel with the signal input of phase demodulator 17 (27), and has a phase responsive input 35 (45) connected by way of a conventional 90° phase lead network 31, a phase shift circuit, with the oscillator output terminal 33. The output from demodulator 13 (23), corresponds in magnitude both with the amplitude of the received signal applied to its signal input, and with the phase displacement between the signals applied to its respective inputs, and specifically equals the product of said input amplitude times the sine of said phase displacement.

It is emphasized that any conventional phase discriminator circuit will operate in the manner just specified should the signal applied to its signal input vary in amplitude in addition to varying in phase. Hence, the so-called phase-responsive amplitude demodulators 13 and 23 used according to the invention may be conventional phase discriminators.

The output from said demodulator 13 (23) is passed through a bandpass filter network 15 (25) having a frequency spectrum matching that of the incident frequency-modulation signals, to a conventional threshold amplitude detector circuit 16 (26), of any suitable type adapted to produce an output voltage of appropriate fixed value when the signal applied to its input exceeds (or falls below) a prescribed threshold level. The value of the threshold level to which the detector 16 (26) responds is made adjustable, as indicated by an arrow. The output from detector 16 (26), is applied to the control input 36 (46) of gate 19 (29).

The phase-responsive demodulator 13 (23) also serves to derive an automatic gain control voltage which is applied by way of the afore-mentioned AGC circuit path (shown with three arrowheads) to the gain control input 37 (47) of input amplifier 11 (21). For this purpose, as shown, the output from demodulator 13 (23) is applied through a low-pass filter network 14 (24) to the control input 37 (47) of amplifier 11 (21), providing a generally conventional AGC feedback circuit.

The detailed manner of operation of the gate control circuitry described above will be discussed later. At this point it is sufficient to indicate that normally, i.e. under low noise conditions, the phase-responsive demodulator 13 (23) is so controlled by the dephased control signal applied to its control input 35 (45) as to deliver at its output a substantially constant output which is filtered out by the filter network 15 (25) and so does not actuate the threshold detector 16 (26). The gate 19 (29) therefore remains open. However, in the event of a spurt or peak of noise occurring in the received signal, and specifically a noise peak approaching a value equal in amplitude and opposite in phase to the received intelligence signal whereby there is a substantial risk of 360° phase rotation and consequent signal loss (as will be later discussed in detail), then the demodulator 13 (23) delivers a substantial output voltage within the passband of the filter network 15 (25), and the filter output actuates the threshold detector 16 (26). The detector 16 (26) then in turn produces an output voltage at the gating input 36 (46) which operates to close the gate.

Thus, assuming for example that the phase responsive demodulator 13 in channel 1 has operated in the manner just described, gate 19 in channel 1 is closed and said channel is disabled. Reception then occurs exclusively through the alternative channel 2, which operates the output oscillator 32 as required to maintain a satisfactory signal at the system output 30.

The arrangement above described ensures that the gate 19 or 29 remains closed substantially only throughout the time of occurrence of a noise peak in the related channel, but not over the subsequent search or hunting period which is usually required, in conventional phase lock systems, for the channel to reacquire synchronism and become locked back on to the useful signal following subsidence of the noise peak. Hence gate closure lasts a minimum period of time. Because of the minimization of the time of gate closure in each channel, the probability that the gates 19 and 29 in both channels would be simultaneously closed is extremely low, orders of magnitude lower than the probability of such event occurring in a conventional diversity system.

Thus, in a typical case, the average percentage of time in which the intelligence signal is masked by noise in each of two diversity channels may be about 1% of the total transmission time, while the total time of noise plus hunting period normally needed to reacquire the intelligence signal after the noise has subsided, may be about ten times greater, i.e. 10%. In a conventional diversity system the probability of simultaneous signal loss in both channels would therefore be of the order of 10%×10%, or a probability of $10^{-2}$, whereas with the system of the invention where the hunting period following the noise period is virtually eliminated, the probability of simultaneous signal loss in both channels would only amount to 1%×1%=$10^{-4}$, a hundredfold improvement.

Figure 2:
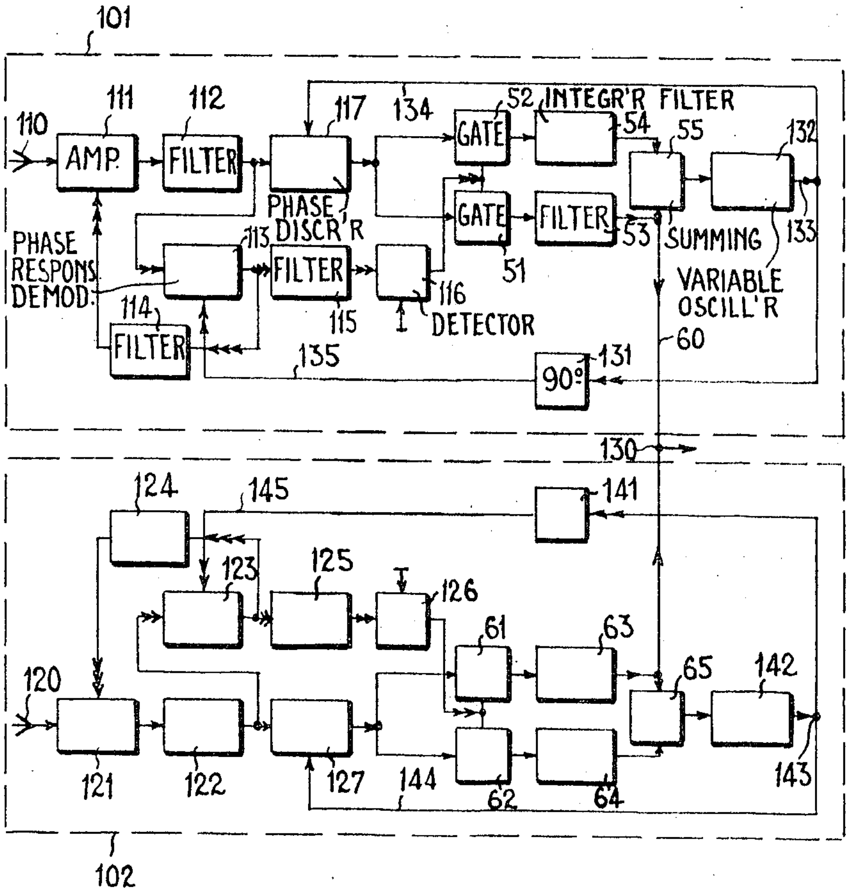
FIG. 2 is a similar illustration of a second embodiment.

In the embodiment of the invention illustrated in FIG. 2, components corresponding to components in FIG. 1 are designated by the same reference numbers plus one hundred. The major differences between the two embodiments stem from the provision of separate output oscillators 132 and 142 one in each of the diversity reception channels 101 and 102 instead of the single, common output oscillator 32 of the embodiment of FIG. 1. The main advantage of this modification lies in its applicability to frequency diversity systems, wherein the two (or more) reception channels are receiving incident signals at different carrier frequencies. Further, the use of two separate oscillators as in FIG. 2 eliminates the need for accurate phase adjustment of the signals into precise synchronous and cophasal relationship as between the diversity channels and in subsequent equipment including I-F amplifier and associated circuits, not shown.

In each channel of the system of FIG. 2, the incident signal from antenna 110 (120) is passed through a variable-gain R-F amplifier 111 (121) and a bandpass filter 112 (122) to a phase discriminator 117 (127) as in the first embodiment. The output of phase discriminator 117 (127) is, in this case, connected to two gates in parallel 51 (61) and 52 (62). To the output of gate 51 (61) is connected a filter 53 (63) and to that of gate 52 (62) is connected a filter 54 (64).

Filters 53 and 63 are constructed to pass the modulation sidebands of the intelligence signals being received by the system while filters 54 and 64 are low-pass filters having an integrating action to pass long-term or drift components of the carrier frequency associated with each channel, and thereby memorize the phase condition of the carrier frequency during periods of closure of the gate 52 or 62 in the associated channel.

The outputs from both filters 53 and 54 (63 and 64) in each channel are applied to the respective inputs of a conventional combining or summing network 55 (65). Moreover, a cross-connecting line 60 interconnects the outputs of both sideband filters 53 and 63 (as well as the outputs of any additional corresponding sideband filters in the case the diversity system uses more than two channels), for joint application of all said outputs to the related inputs of all the combining networks such as 55 and 65.

The output from each combining network 55 (65) is applied to the modulation input of a related variable frequency oscillator 132 (142). The frequency modulated output of the oscillator is applied through a first feedback connection 134 (144) to control the phase of the discriminator 117 (127) as in the first embodiment. The output of oscillator 132 (142) is also applied to a 90° phase lead network 131 (144), and the dephased output signal is applied over a feedback connection 135 (145) to the phase responsive input of phase-responsive amplitude demodulator 113 (123) having its signal input connected in parallel with that of phase discriminator 117 (127). Demodulator 113 (123) forms part of the gate control path of each channel of the system of FIG. 2 and may be constructed as a conventional phase discriminator similar to phase discriminator 117 (127), as earlier indicated with reference to FIG. 1.

The output of demodulator 113 (123) is applied by way of a bandpass filter 115 (125) having a passband corresponding to the modulation frequency band of the received signals, to an adjustable threshold detector 116 (126) and the detector output is applied in parallel to the control or gating inputs of both gates 51 (52) and 61 (62). The system output 130 may, as shown, be tapped from the cross-connecting line 60.

Each of the channels 101 and 102 further includes an AVC feedback loop which extends from the output of phase-responsive demodulator 113 (123) by way of a low-pass filter 114 (124) to the gain-varying input of R-F amplifier 111 (121) as in the first embodiment.

The operation of the embodiment of FIG. 2 can be summarized as follows. In the absence of excessive noise in one of the two diversity channels of the system, say the upper channel 101, the associated phase-responsive demodulator 113 delivers substantially no output within the signal modulation frequency band so that filter 115 produces no output and detector 116 is not actuated and both gates 51 and 52 remain open. The carrier frequency of the signal passing through channel 101, which in this embodiment may differ from the carrier frequency of the signal passing through channel 102, is after demodulation applied through filter 54 to one input of the associated combining network 55, while the modulation sideband frequency, which is the same for both channels, is after demodulation appleid through filter 53 to the other input of both combining networks 55 and 56. Output oscillator 132 is therefore controlled to produce a signal at output 133 which corresponds to the received input signal. Assuming the other channel 102 is also noise-free at this time, the associated oscillator 142 also delivers at its output 143 a signal which corresponds to the received input signal. The signal appearing at either one of the oscillator outputs 133 and 143 may be used as the output signal of the system. As here shown however, the output signal is derived in demodulated form at the terminal 130 on cross-connecting line 60.

Should a noise peak liable to result in signal loss develop in the lower channel 102, the related phase-responsive demodulator 123 produces an output voltage within the passband of filter 125 as described for the first embodiment and as later discussed in greater detail. This voltage, acting through adjustable threshold detector 126 preferably after a short delay produced in a conventional delay device not shown, closes both gates 61 and 62. The demodulated sideband frequencies of the signal passing through channel 102 are then preventde from being applied to the lower combining network 65. However, the demodulated sideband signal from the upper channel 101, assumed at this time to be noise-free, is applied over cross-connection 60 to one input of said lower combining network 65, while moreover the filter 64 owing to its intergrating or memorizing characteristic continues to apply a voltage indicative of the long-term frequency and phase condition of the carrier wave to the other input of said combining network 65. The lower oscillator 142 therefore continues to be operated to deliver at its output 143 a signal which is a noise-free version of the received signal to provide the necessary phase-lock feedback in the lower channel.

If the noisy channel is the upper channel 101 rather than the lower channel 102, then of course the lower combining network 65 is supplied with carrier and sideband signals from the lower channel 102 only, and the lower oscillator 142 again is operated to deliver the desired noise-free phase-nock signal.

It will be apparent that owing to the provision of separate oscillators in the respective channels the embodiment just described will operate regardless of whether or not the signals propagating through the channels are synchronized in frequency and/or phase. This embodiment therefore is applicable to frequency-diversity receivers. In fact, this embodiment may also be desirably used in cases where the carrier frequencies in the respective channels are the same, as in position-diversity systems, in that it will eliminate the need for accurate synchronization and phase coordination between the channels.

The detailed operation of the invention will now be discussed more fully.

In an angle-modulation system of the phase-lock type as heretofore used, the basic reason a condition of signal-loss is liable to occur, lies in the angular ambiguity of 360° which is inherently present in any determination of phase. That is, a given value of phase angle can represent any one of an infinite set of values of the intelligence signal being transmitted. This indeterminacy is immaterial in the absence of noise because the modulation angle varies in a continuous manner throughout modulation of the intelligence signal and consequently there is no danger of the system losing track of the true modulation angle.

However, the injection of a sudden spurt of random noise into the system is liable to result in a spurious change of the modulation angle by one or more times 360° in either sense. The phase-lock system will then lock in (i.e. become synchronized) with the spurious noise signal resulting in prolonged signal loss as already explained herein.

The system of the invention can be said to detect those periods, during operation of the phase-lock receiver, when a high probability exists of the noise inducing a spurious phase angle variation of 360° or more, and disable the reception channel involved during such periods, thereby preventing the phase-lock system from becoming locked in with the noise signal. At the same time the system operates to preserve the continuity of signal reception through other means, and specifically through the use of an alternative reception channel in a diversity system, and/or through memorization or storage of the last reliable signal value as by means of an integrating device (such as integrating filter 54 in FIG. 2).

Figure 3:
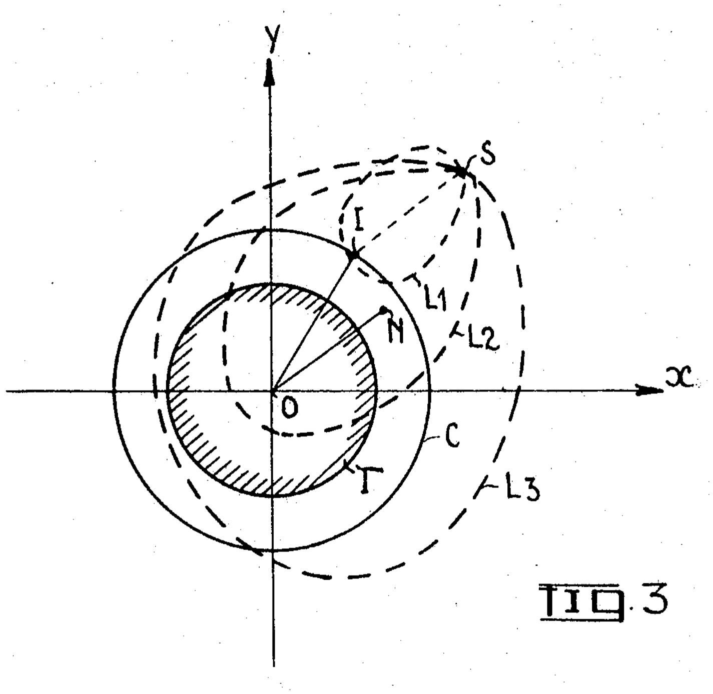
FIG. 3 is a vector or phasor diagram used in explaining certain aspects of the operation of the invention.

The operation of the system can best be understood by referring to the diagram of FIG. 3 which is a standard vector or phasor representation in the complex plane. In such a diagram, as is well-known, an angle-modulated signal is represented by a vector of constant length rotating about the center O, such as the vector OI, with the representative point I describing the circumference C. In the case of a frequency modulation system, the information or intelligence signal is represented by the variable angular velocity of vector OI, while in the case of phase modulation the intelligence is represented by the angular displacement of the vector with respect to a reference vector rotating at uniform angular velocity (which corresponds to the carrier frequency of the transmitted signal). In such a diagram, further, a noise signal when present is represented by a vector of random orientation such as ON. In the presence of noise, therefore, the total received signal is represented by a vector such as OS, the vector sum $OI+ON$.

The presence of a noise signal such as ON, in that it shifts the signal vector from OI to OS, will cause a very brief distortion in the intelligence conveyed, but will not generally induce signal loss. Nor will there be signal loss in the case of a spurt of random noise causing the signal-representing point S to describe a random loop such as $L_1$ which does not encompass the origin O, since the resulting variation in the phase angle of the vector OS at no time exceeds 360° during its displacement, and the phase angle of the distorted total received signal OS hence remains the same as the phase angle of the intelligence signal component OI.

Should however the spurt of noise be of such character as to cause the point S to describe a random path such as $L_2$ or $L_3$ which encompasses the origin O, it is evident that the phase angle of the received signal would undergo a variation of 360°, and hence the phase angle of the signal after the disturbance would differ from the phase angle of the true intelligence signal OI. The phase lock system will then lock in with the spurious altered phase condition as a result of the disturbance. The system will thereupon "receive noise" rather than receiving intelligence, and this situation will tend to persist due to the inherent phase-lock operation of the system. This is the situation the invention seeks to prevent.

In attaining this object, the invention relies on the following consideration. Of all possible origin-encircling paths such as $L_2$, $L_3$ the likelihood of occurrence of such a path is very much greater in the case of a path passing close to the origin such as the path $L_2$, than it is for a path passing a substantial distance from the origin, such as $L_3$. The reason lies in the well-recognized fact that the random orientation of the noise vector ON has a Gaussian probability density distribution about the origin O. In other words, at any particular instant of time all orientations for the noise vector ON about the origin are equally probable, and there is maximum probability for the point N to be located at the origin O, with said probability falling off extremely rapidly with increasing radial distances from the origin.

In accordance with the invention, therefore, means are provided for sensing the fact that a point S representative of an input signal approaches the origin to within less than a prescribed distance, i.e. enters a circumference Γ of prescribed, relatively small radius. In yet other words, means are provided for sensing a drop in total signal amplitude to a value dangerously approaching zero. Such an event, when sensed by the system, is taken as denoting that the input signal, due to the noise disturbance sustained by it, has a high probability of undergoing a full 360° rotation of the modulation phase angle with respect to the true phase angle of the intelligence component (OI) in the signal, and hence in resulting in the loss of the intelligence.

The manner in which this sensing step is performed in the embodiments of the invention described will now be further explained with reference to the diagram of FIG. 4. The representation used in this diagram is a "rotating phasor" representation, generally similar to the one used in FIG. 3 except that the plane of coordinates $x'$ $y'$ is assumed to be revolving bodily about the origin O at a constant angular velocity equal to $2\pi$ times the frequency of the output oscillator such as 32 (FIG. 1). It is readily shown that with such a representation the abscissae $x'$ represent the output signal voltage from phase discriminator 17 (27) while the ordinates $y'$ represent the output signal voltage from phase responsive demodulator 13 (23) controlled in accordance with quadrature signal from phase shifter 31.

In the absence of noise, the signal-representing point I would describe a circular arc $I_1I_2$ of very small amplitude about the ordinate axis owing to the phase-lock action effected by the phase feedback line 34 (44) to phase discriminator 17 (27). The radius of this circular arc is held constant at a value determined by the AGC circuit such as 13–14–37–11. The demodulator 13 (23) then delivers a substantially constant output voltage and the filter 15 (25) consequently delivers substantially no output. Threshold detector 16 (26) is not actuated and gate 19 (29) remains open.

In the presence of noise the representative point S will make outward and inward excursions above and below the arc $I_1I_2$ while remaining in an area surrounding the arc. This, as will be understood, is due to the fact that noise is varied both in phase and amplitude, in contrast to the intelligence signal which is varied in phase but is fixed in amplitude.

Since arc $I_1I_2$ can practically be equated with a straight segment perpendicular to the axis $Oy'$, it is seen that the signal ordinate $y'$ can at all times be taken as a measure of the total signal strength, i.e. the length of the vector OS in FIG. 3. When the total input signal ordinate $y'$ drops below a prescribed value $y'_0$ which is the same as the radius of the circumference in FIG. 3, there is a high probability of signal loss in the channel as earlier explained. This variation in signal amplitude is sensed by the phase-responsive amplitude-demodulator 13 (23), which produces a correspondingly varying output, and the variation in demodulator output is passed by filter 15 (25) to actuate threshold detector 16 (26) and close gate 19 (29).

In regard to the passband characteristics of filter 15 (25), it should be noted that in accordance with conventional phase-lock practice, the effective frequency band through which phase feedback gain is present should be made substantially equal to the signal modulation frequency band for proper operation of the phase-lock circuit. Hence, it is satisfactory to provide filter 15 (25) with the same passband characteristics as said modulation frequency band, whereby detector 16 (26) will respond to variations in noise amplitude having frequencies similar to the signal modulation frequencies.

Closure of gate 19 (29) disables the reception channel under consideration. Reception then occurs exclusively through the remaining channel or channels of the diversity system. Further, when this is desired, as in the system of FIG. 2, long-term variable conditions in the received frequency, especially due to drift of the carrier frequency, are memorized in a suitable integrator or storage network (54, 64) so as to be restored at the time the disabled channel resumes operation or continuously throughout the period the channel remains disabled, and thereby avoid any discontinuity in the operation of the system.

Figure 4:
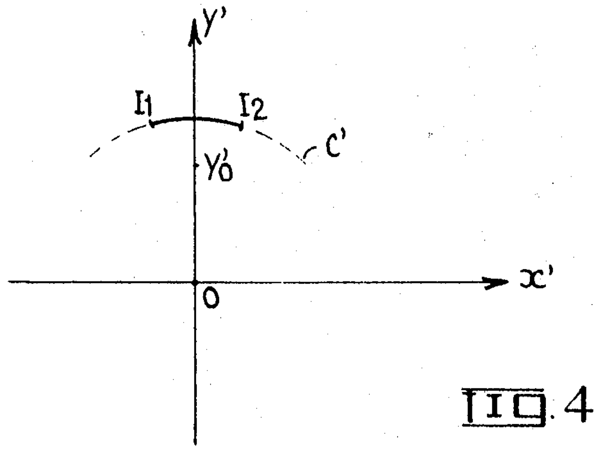
FIG. 4 is another explanatory diagram using a rotating-coordinate phasor representation.

Another and briefer way of stating the inventive concept and summarizing the theoretical discussion given above with reference to FIGS. 3 and 4, is to say that the system of the invention senses the times when the total received signal decreases sharply, indicating that the noise component in the received signal approaches a condition in which it would be equal in amplitude and opposite in phase to the intelligence component in said signal, i.e. tends to cancel the intelligence content, and at such times disables the reception channel.

Since the component circuits used in the systems of the invention may all be conventional per se, a detailed disclosure of their construction would be superfluous. The following additional information concerning some of the more important ones of said component circuits may, however, prove helpful to those skilled in the art in selecting the characteristics of such components suitable for optimal performance of the invention.

The filter networks used may be of any conventional type provided they have the requisite passbands as herein specified and have amplitude phase response curves satisfying Nyquist's stability criterion. The filters such as 14 and 24 (FIG. 1) used in the AGC loops should pass low frequency signals including DC and fading-effect components. The filters designated 15 (25) and 18 (28) in FIG. 1 should preferably have equal upper cut-off frequency values, and filter 18 (28) should, in addition, pass a similar low-frequency band as that passed by the AGC filter 14 (24).

The phase discriminators such as 17 (27) are entirely conventional in that each delivers an output voltage corresponding in magnitude and polarity to the amount and sense of phase displacement present between the signals applied to its respective inputs. As earlier indicated, the phase-responsive amplitude demodulators such as 13 (23) may be constructed similar to the phase discriminators 17 (27). They differ in operation from these latter only in that their output varies not only with the phase displacement between their inputs, but also with the variable noise amplitude applied to their signal input. While the circuits such as 13, 23, are here generally referred to as phase-responsive amplitude demodulators, they may alternatively be described as amplitude-responsive phase discriminators.

The circuits such as 16 and 26, referred to as threshold detectors, may be of any suitable type capable of delivering a predetermined fixed voltage output when the input signal applied thereto rises above (or drops below) a prescribed, adjustable, threshold level.

The gates 19, 29, 51, 52, 61, 62 are electronic gating or switching circuits of any suitable design, using diodes or the like, switchable to an open or a closed state according to the signal condition present at their control input.

It will be apparent that various modifications may be introduced into the exemplary embodiments shown in FIGS. 1 and 2 without departing from the scope of the invention.

Thus, the invention is conceivably applicable to a single channel receiving system, in which case suitable memory or storage means, such as an integrating filter similar to the filters 54 or 64 in FIG. 2, would be included in order to "interpolate" the missing part of the signal during the closure periods of the gate in such single channel and thereby maintain continuous reception.

Further, in the embodiment of FIG. 2, the two gates 51 and 52, and 61 and 62, shown provided in each of the reception channels, may be replaced by a single gate connected in the output of the phase discriminator 17 or 27 and having its control input supplied with the output of the related threshold detector 16 or 26. The use of two gates in each channel, as illustrated in the drawings, is usually found preferable however in view of the different frequency characteristics which the gates must possess.

In the present specification and claims, the term "angle" should be taken with the meaning of either phase or frequency, or both, wherever, and as the context permits. Thus "angle modulation" may denote either phase or frequency modulation. A variable-angle oscillator is an oscillator whose output signal can be varied either in phase, or both in frequency and phase; and the angle-controlling input of such an oscillator is the input to which a control voltage can be applied for varying the phase, or the frequency and phase, of the output signal.

What I claim is:

1. An angle-modulated signal receiving system comprising, in combination, angle-discriminator means having a discriminator input for receiving angle-modulated intelligence signals, a discriminator output, and an angle-responsive input; variable-angle oscillator means having an angle-controlling input connected to said discriminator output and having an oscillator output; feedback means connecting said oscillator output with said angle-responsive input of said angle-discriminator means; gating means connected between said discriminator output and said angle controlling input, and including a gate control input, whereby in a normally open condition of said gating means said intelligence signals are applied to said angle-controlling input of said variable-angle oscillator means for modulating the output signal of said variable-angle oscillator means in accordance with the modulation angle of said intelligence signals; and gate control circuit means having a control circuit input connected to receive said angle-modulated intelligence signals and a control circuit output connected to said gate control input, said gate control circuit means including means responsive to a substantial decrease in signal amplitude of said intelligence signals, indicative of a noise component in said intelligence signals liable to create signal loss, for furnishing a control circuit output signal operative for closing said gating means and preventing application of the noise-affected intelligence signal to said angle-controlling input.

2. A receiving system as set forth in claim 1, wherein said means responsive to a substantial decrease in total signal amplitude of said intelligence signals comprise angle-responsive amplitude demodulator means having an amplitude demodulator input connected to receive said intelligence signals, an amplitude demodulator output connected to said gate control input, and an angle-responsive amplitude demodulator input; and a phase shift circuit having a phase shift input connected to said oscillator output and a phase shift output connected to said angle-responsive amplitude demodulator input.

3. A receiving system set forth in claim 1 wherein said angle discriminator means, said feedback means, said gating means and said gate control circuit constitute the first channel of a plural channel diversity receiving system; further comprising a second channel, identical to said first channel, and identically connected to said variable oscillator means.

4. A plural channel receiving system as set forth in claim 3 wherein said means responsive to a substantial decrease in total signal amplitude in said gate control circuit in each of said channels includes angle-responsive amplitude demodulator means having an amplitude demodulator input connected to receive said intelligence signals, an amplitude demodulator output connected to said gate control input, and an angle-responsive amplitude demodulator input; and a phase-shift circuit having a phase-shift input connected to said oscillator output and having a phase-shift output connected to said angle-responsive amplitude demodulator input.

5. An angle-modulated signal receiving system as set forth in claim 1 wherein said feedback means comprise an angle-lock feedback line.

6. A plural channel receiving system as set forth in claim 3 wherein said variable oscillator means comprise a variable oscillator for each of said channels.

7. A plural channel receiving system as set forth in claim 4 wherein said gating means comprise a first gate and a second gate each of said gates having a gate input connected to said discriminator output and a gate output; further comprising integrator means connected between one of said gate outputs and said angle controlling input of said variable-angle oscillator means.

8. A plural channel receiving system as set forth in claim 4 further comprising automatic gain control circuit means in each channel for maintaining the received signal level in the corresponding channel substantially constant.

9. A plural channel receiving system as set forth in claim 8 wherein said automatic gain control circuit means each comprises a variable gain device connected in the respective channel, said variable gain device having a gain-varying input; and additional feedback means connected from said amplitude demodulator output to said gain-varying input of said variable gain device.

10. A plural channel receiving system as set forth in claim 8 wherein said intelligence signals contain modulation frequencies; further comprising filter means for passing said modulation frequencies connected between said amplitude demodulator output and said gate control input.

11. A plural channel receiving system as set forth in claim 8 further comprising adjustable threshold amplitude detecting means connected between said amplitude demodulator output and said gate control input.

12. A plural channel receiving system as set forth in claim 4 wherein said variable-angle oscillator means comprise a common variable-angle oscillator for all of said channels.

13. A plural channel receiving system as set forth in claim 1 wherein said intelligence signals comprise carrier frequencies and modulation frequencies; wherein each of said gating means comprises a first and second gate, each having a gate input connected to said discriminator output; wherein each channel includes a first and second parallel signal path, said first signal path including said first gate, a first filter network for passing said modulation frequencies of said intelligence signals, said second path including said second gate and integrator filter means for storing long-term drift variations in said carrier frequencies; summing means for combining the outputs of both signal paths for application to the angle-controlling input of the associated variable-angle oscillators; and cross-connecting means between the channels for applying the output of said first path of each channel to the angle-controlling input of the variable-angle oscillators associated with the other channels.

14. An angle-modulated signal receiving system comprising antenna means; a plurality of diversity-reception channels having inputs connected to respective antenna means and receiving diversified signals therefrom; automatic gain control means in each channel connected for maintaining the received signal level substantially constant; a phase-discriminator in each channel having a discriminator input connected for receiving the constant-level signal from said automatic gain control means and having a discriminator output and a phase-responsive input; a variable angle oscillator having an angle-controlling input connected to the outputs of all the channels and having an oscillator output; feedback means connecting said oscillator output with said phase-responsive input of the discriminator in each channel; a gate in each channel having a gate input, a gate output and a gate control input, whereby in a normally-open condition of said gate signals from the antenna means will be applied by way of all said channels to said variable-angle oscillator to modulate the output thereof in accordance with the angle-modulation characteristics of the received signals; and a gate control circuit associated with each channel including a phase-responsive amplitude demodulator having a signal input connected for receiving said constant-level signals from the automatic gain control means of the channel, a signal output connected to the gate control input of the gating means of the channel, and a phase-responsive input; and a phase shift circuit connecting said variable-angle oscillator output with the phase-responsive input of said amplitude demodulator of the channel, whereby each gate controlling circuit responds to a noise-induced decrease in the amplitude of the signal passed through the associated channel for closing said gate and disabling the channel.

15. An angle-modulated signal receiving system comprising antenna means; a plurality of diversity-reception channels having inputs connected to the antenna means and receiving diversified signals therefrom; automatic gain control means in each channel connected for maintaining the received signal level substantially constant; a phase-discriminator in each channel having a discriminator input connected for receiving the constant-level signal from said automatic gain control means and having a discriminator output and a phase-responsive input; variable-frequency oscillators each having a frequency-controlling input connected to the output of an associated channel and having an output; feedback means connecting the output of each variable-frequency oscillator with the phase-responsive input of the discriminator in the associated channel; gating means in each channel having a gate input connected to said phase discriminator and comprising two gates per channel; two parallel signal paths in each channel connected to said discriminator output, one of said paths including one of said gates and first filter means passing a modulation frequency band of the received signals, and the other of said paths including the other of said gates and integrator filter means for storing long-term drift conditions of said carrier frequency; summing means in each channel having inputs receiving the output signals from both paths and having an output connected for applying the combined signals to said frequency-controlling input of the associated variable-frequency oscillator; cross-connection means between the channels applying the output signals from the one path in each channel to said frequency-controlling inputs of the variable-frequency oscillators associated with remaining channels, whereby in a normally-open condition of said gating means signals from the antenna means will be applied by way of said channels to said variable-frequency oscillators to modulate the outputs thereof in accordance with the angle-modulation characteristics of the received signals; and a gate control circuit associated with each channel including a phase-responsive amplitude demodulator having an amplitude demodulator input connected for receiving said constant-level signals from the automatic gain control means of the channel, amplitude demodulator output connected to the gate control input of the channel and a phase-responsive input; and a phase shift circuit connecting said variable-frequency oscillator output with the phase-responsive input of said amplitude demodulator of the channel, whereby each gate control circuit responds to a noise-induced reduction in the amplitude of the signal passed through the associated channel for closing said gating means and disabling the channel.

16. The system defined in claim 15, which is a frequency-diversity reception system and wherein said carrier frequencies associated with the signals passed through the respective channels are different.

17. The system defined in claim 15, which is a frequency diversity reception system and wherein said carrier frequencies associated with the signals passed through the respective channels are different.

References Cited

UNITED STATES PATENTS

| | | | |
|---|---|---|---|
| 3,029,338 | 4/1962 | Sichak | 325—302 |
| 3,188,571 | 6/1965 | Michael. | |
| 3,195,049 | 7/1965 | Altman et al. | 325—305 |
| 3,328,698 | 6/1967 | Schreder | 325—304 |
| 3,348,152 | 10/1967 | Laughlin et al. | 325—305 |
| 3,366,884 | 1/1968 | Kurusu | 325—348 XR |

KATHLEEN H. CLAFFY, Primary Examiner

R. S. BELL, Assistant Examiner

U.S. Cl. X.R.

325—305, 348, 419